United States Patent
Han

(10) Patent No.: US 8,862,319 B2
(45) Date of Patent: Oct. 14, 2014

(54) OVER-CURRENT DAMAGE PREVENTION METHOD AND APPARATUS FOR SUBSIDIARY INVERTER OF ELECTRIC BUS

(71) Applicant: Hyundai Motor Company, Seoul (KR)

(72) Inventor: Kyung Su Han, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 13/686,404

(22) Filed: Nov. 27, 2012

(65) Prior Publication Data

US 2014/0074354 A1 Mar. 13, 2014

(30) Foreign Application Priority Data

Sep. 13, 2012 (KR) .................. 10-2012-0101707

(51) Int. Cl.
| | |
|---|---|
| *G06F 17/00* | (2006.01) |
| *G06F 19/00* | (2011.01) |
| *B62D 6/00* | (2006.01) |
| *B60L 3/00* | (2006.01) |
| *B60L 11/18* | (2006.01) |
| *B62D 5/04* | (2006.01) |
| *B62D 5/00* | (2006.01) |

(52) U.S. Cl.
CPC . *B62D 5/046* (2013.01); *B62D 5/00* (2013.01); *B60L 3/00* (2013.01); *B60L 11/18* (2013.01)
USPC ............. 701/36; 701/41; 180/65.22; 340/439

(58) Field of Classification Search
USPC ......... 701/22, 36, 41, 43, 29.1; 340/438, 439; 180/65.1, 65.21, 65.22
See application file for complete search history.

(56) References Cited

U.S. PATENT DOCUMENTS

| | | | | | |
|---|---|---|---|---|---|
| 4,259,845 | A | * | 4/1981 | Norbeck ........................ | 62/209 |
| 5,669,226 | A | * | 9/1997 | Kurahashi et al. .............. | 62/227 |
| 5,780,731 | A | * | 7/1998 | Matsui et al. .............. | 73/114.01 |
| 6,523,361 | B2 | * | 2/2003 | Higashiyama ............... | 62/228.4 |
| 2002/0108384 | A1 | * | 8/2002 | Higashiyama ............... | 62/228.4 |
| 2010/0246083 | A1 | * | 9/2010 | Shibuya ........................ | 361/93.8 |
| 2011/0196573 | A1 | * | 8/2011 | Lee et al. ........................ | 701/36 |
| 2012/0119683 | A1 | * | 5/2012 | Matsuyama .................... | 318/51 |

FOREIGN PATENT DOCUMENTS

| | | |
|---|---|---|
| JP | 10147443 A | 6/1998 |
| JP | 11027805 A | 1/1999 |
| JP | 2002122077 A | 4/2002 |

(Continued)

*Primary Examiner* — Thomas Tarcza
*Assistant Examiner* — Edward Pipala
(74) *Attorney, Agent, or Firm* — Edwards Wildman Palmer LLP; Peter F. Corless

(57) ABSTRACT

Disclosed herein is an over-current damage prevention method and apparatus for a subsidiary inverter of an electric bus, which may reduce surge current generated due to a substantially abrupt occurrence of a load when a clutch is connected thereon by reducing the speed of a power steering motor before the clutch is connected thereon. The method and apparatus include sensing, by a sensor, a pressure of an air tank and an on position of an air pressure; reducing, by an inverter, a speed of a power steering motor by controlling the voltage applied to the power steering motor when the pressure of the air tank is less than a setup value or when the air pressure switch is on; and in response to reducing the speed of the power steering motor, maintaining a clutch in an engaged position to transmit power from the power steering motor to an air compressor.

3 Claims, 6 Drawing Sheets

(56) References Cited

FOREIGN PATENT DOCUMENTS

| | | |
|---|---|---|
| JP | 2009108754 A | 5/2009 |
| KR | 10-2006-0073723 | 6/2006 |
| KR | 10-2007-0077658 A | 7/2007 |
| KR | 10-2009-0062246 A | 6/2009 |
| KR | 10-2009-0062666 | 6/2009 |

\* cited by examiner

OVER-CURRENT DAMAGE PREVENTION METHOD AND APPARATUS FOR SUBSIDIARY INVERTER OF ELECTRIC BUS

CROSS-REFERENCE

This application claims under 35 U.S.C. §119(a) the benefit of Korean Patent Application No. 10-2012-0101707 filed Sep. 13, 2012, the entire contents of which are incorporated herein by reference.

BACKGROUND OF THE INVENTION (a) Field of the Invention

The present inventions relates to an over-current damage prevention method and apparatus for a subsidiary inverter of an electric bus, which may prevent generation of over-current in the subsidiary inverter of the electric bus when a clutch of an air compressor is connected thereon.

(b) Description of the Related Art

The importance of maintaining a green environment has recently been increasing and as such, low-floor buses using natural gas (e.g., other than petroleum-based fuel) are operating in cities. Many car manufacturers have developed electric buses as a next-generation transportation means.

A series of battery packs may be mounted in the body of an electric bus to drive the driving wheels through a motor receiving electric power supplied from the battery packs and to drive various types of auxiliary machinery apparatuses, such as a steering apparatus and a cooling apparatus.

FIG. 1 is an exemplary schematic view illustrating a power network configuration of an electric bus, according to the related art. FIG. 2 is an exemplary configuration illustrating a configuration of an auxiliary inverter of the electric bus, according to the related art.

The voltage of a high-voltage battery 1 of the electric bus may be applied to a 230V DC/AC auxiliary machinery inverter 3 through a high-voltage junction box 2, and the auxiliary machinery inverter 3 may convert a DC voltage of 380V, applied from the battery 1, into an AC voltage of 230V. Auxiliary machinery, such as an air compressor and power steering pump 4 and a water pump, 5 may be driven by receiving the converted AC voltage from the auxiliary machinery inverter 3.

In this case, after the electric bus starts moving, a power steering motor 6 may be rotated at a high speed, an air compressor 8 may be connected to the power steering motor 6 by a belt, and a clutch 7 may be mounted to the air compressor 8. When the clutch 7 is engaged, the air compressor may be operated by receiving power from the belt.

The operating condition of the air compressor 8 will now be described. When the pressure of an air tank is lower than a setup value (e.g., 8 Bar), gas stored in the air tank may be compressed under the operation of the air compressor 8. Moreover, when the pressure of the air tank is higher than the setup value, the operation of the air compressor 8 may be stopped.

However, when the power steering motor 6 is rotated at the high speed, the air compressor 8 may operate while the clutch 7 is engaged. In this case, surge current may be generated due to the abrupt occurrence of a load, thus, the inverter 3 that applies electric power to the auxiliary machinery may be damaged.

The above information is only for enhancement of understanding of the background of the invention and therefore it may contain information that does not form the prior art that is already known to a person of ordinary skill in the art.

SUMMARY OF THE INVENTION

The present invention has been made in an effort to solve the above-described problems associated with prior art. Accordingly, the present invention provides an over-current damage prevention method and apparatus for a subsidiary inverter of an electric bus, which may reduce surge current generated due to the abrupt occurrence of a load when a clutch is connected thereon by lowering the speed of a power steering motor before the clutch is connected thereon.

In one embodiment, the present invention provides an over-current damage prevention method, including: sensing a pressure of an air tank through a pressure sensor and sensing whether an air pressure switch is on; reducing a speed of a power steering motor by controlling the speed of the power steering motor when the pressure of the air tank is less than a setup value or when the air pressure switch is on; and maintaining an engaged position of a clutch to transmit power of the power steering motor to an air compressor after the speed of the power steering motor is reduced, thereby preventing the subsidiary inverter from being damaged due to the abrupt generation of surge current.

In another embodiment, the present invention provides an over-current damage prevention apparatus, including: a pressure sensor and an air pressure switch, configured to detect a pressure in an air tank; and an inverter, which includes a controller, configured to receive a signal from the pressure sensor and the air pressure switch to control the speed of a power steering motor by controlling the voltage applied to the power steering motor when the pressure of the air tank is less than a setup value or the air pressure switch is on.

Advantageously, according to the above exemplary embodiment of the present invention, when the pressure of the air tank is less than a setup value or the air pressure switch is on, the speed of the power steering motor may be reduced before the air compressor is operated, to prevent the subsidiary inverter from being damaged due to the generation of surge current, thereby ensuring reliability of components. Furthermore, since subsidiary inverters are conventionally very costly to replace when damaged, the present invention reduces costs associated with replacement. Lastly, the present invention renders it possible to prevent, in advance, an accident caused from loosing control of the steering and braking of the vehicle due to the non-operation of the power steering motor and the air compressor when the subsidiary inverter is damaged while driving.

BRIEF DESCRIPTION OF THE DRAWINGS

The above and other features, objects and advantages of the present invention will now be more clearly understood from the following detailed description taken in conjunction with the accompanying drawings which are given hereinbelow by way of illustration only, and thus are not limitative of the present invention, and wherein.

Figure 1:
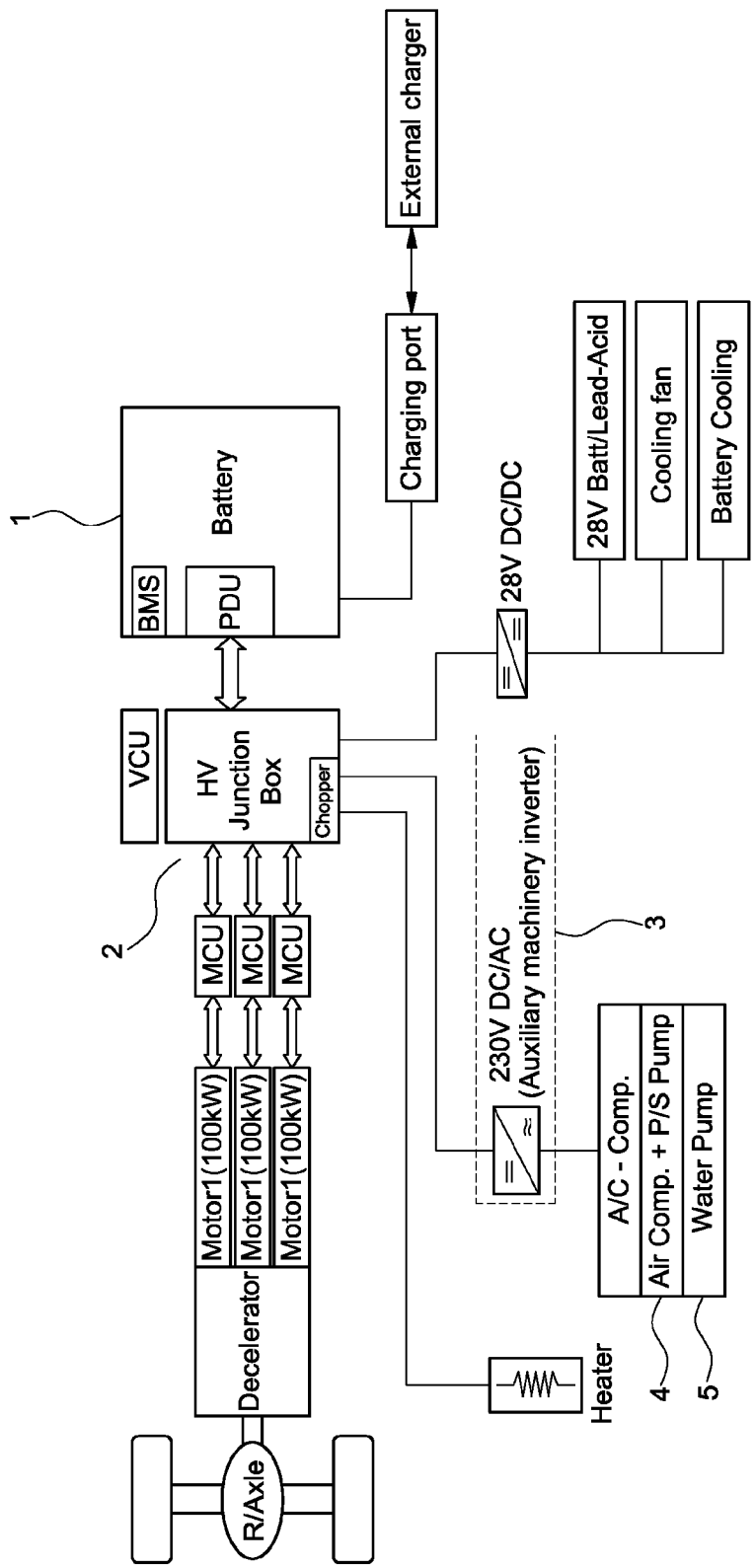
FIG. 1 is an exemplary schematic view illustrating a power network configuration of an electric bus, according to a related art.
Figure 2:
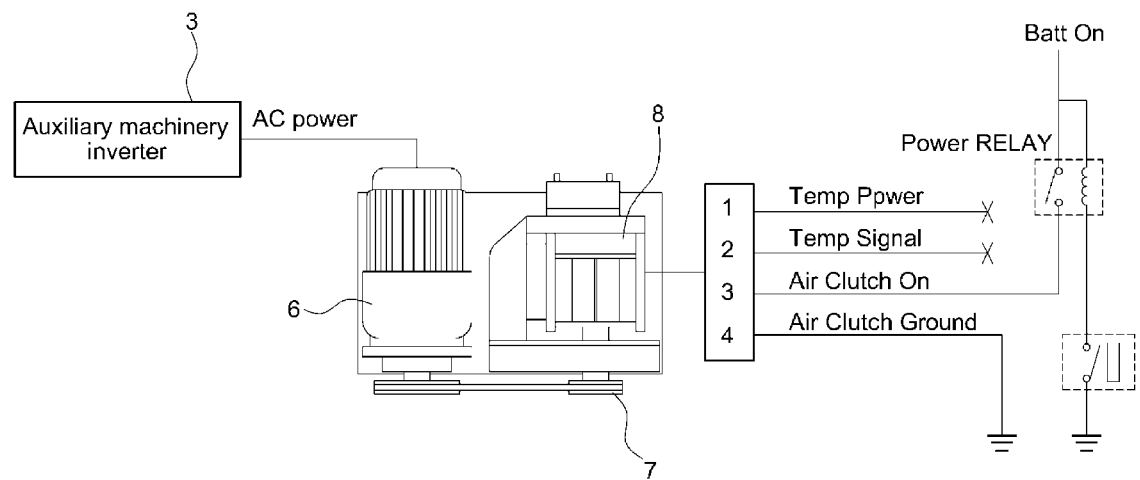
FIG. 2 is an exemplary configuration illustrating a configuration of an auxiliary inverter of the electric bus, according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
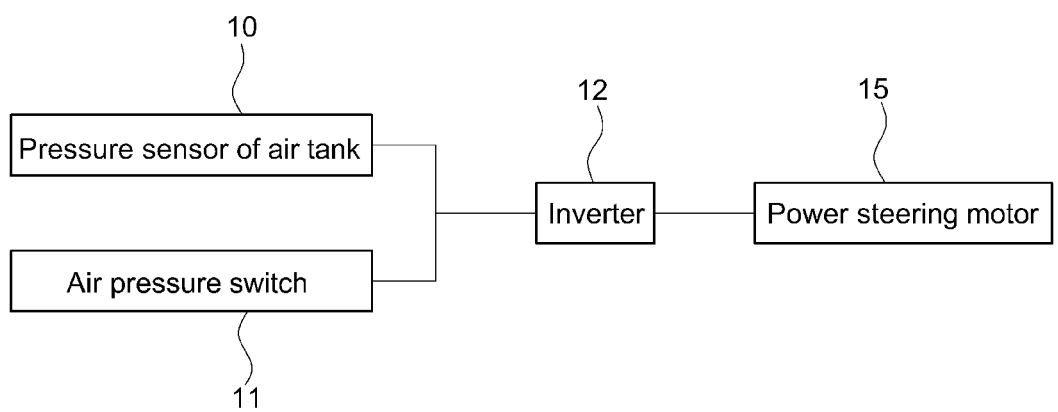
FIG. 3 is an exemplary schematic view illustrating a configuration of an over-current damage prevention apparatus for a subsidiary inverter of an electric bus, according to an exemplary embodiment of the present invention.
Figure 4:
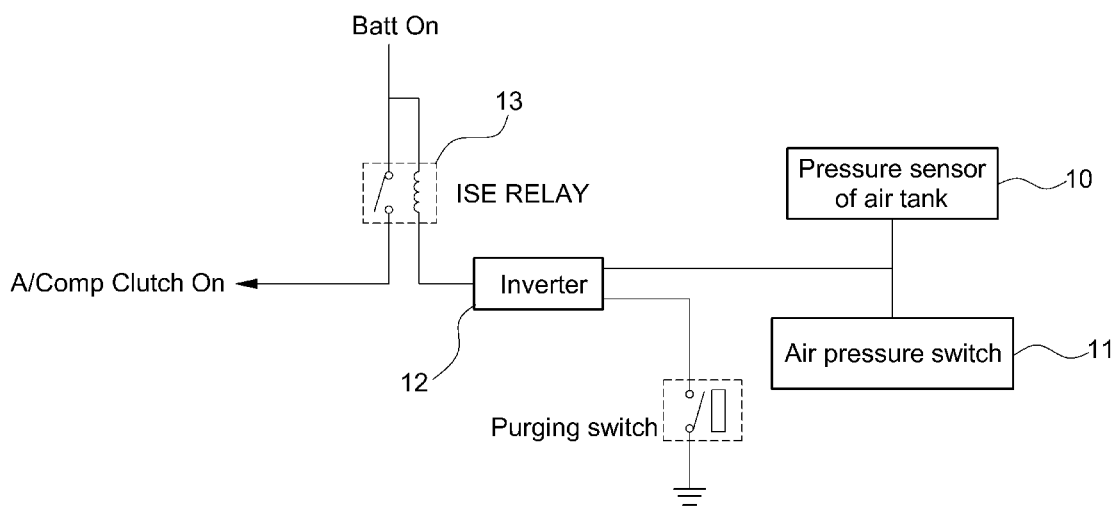
FIG. 4 is an exemplary circuit configuration of FIG. 3, according to an exemplary embodiment of the present invention.
Figure 5:
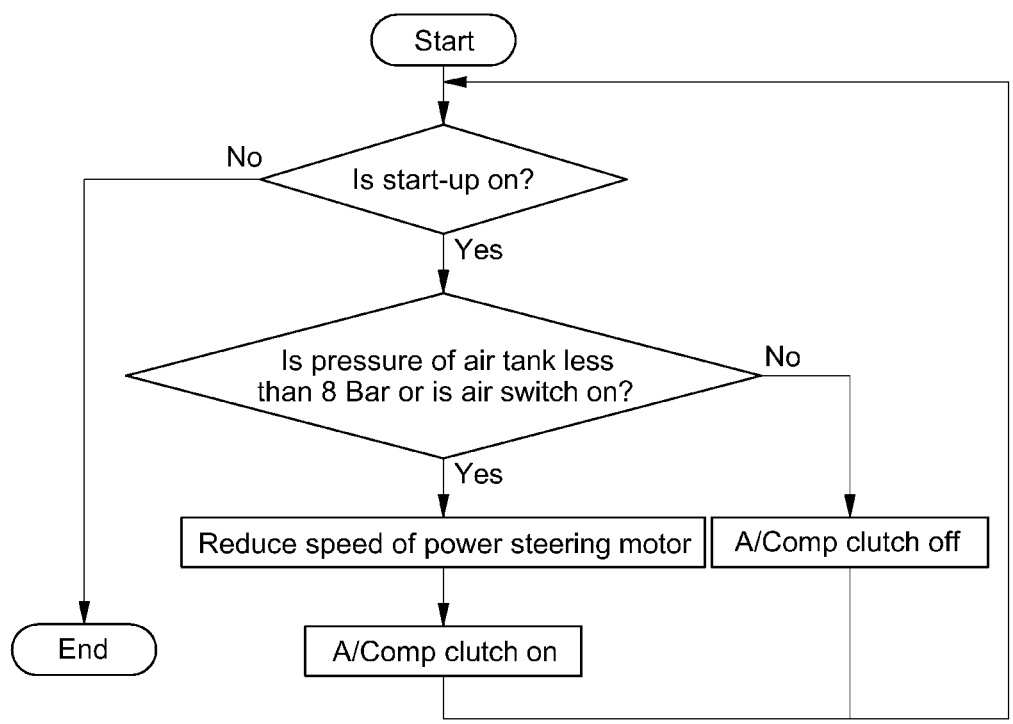
FIG. 5 is an exemplary flowchart illustrating an over-current damage prevention method for a subsidiary inverter of an electric bus, according to an exemplary embodiment of the present invention.

FIG. 3 is an exemplary schematic view illustrating a configuration of an over-current damage prevention apparatus for a subsidiary inverter of an electric bus according to an exemplary embodiment of the present invention. FIG. 4 is an exemplary circuit configuration of FIG. 3. FIG. 5 is an exemplary flowchart illustrating an over-current damage prevention method for a subsidiary inverter of an electric bus according to an exemplary embodiment of the present invention.

The present invention provides an over-current damage prevention method and apparatus for a subsidiary inverter 12 of an electric bus, which may prevent the subsidiary inverter 12 from being damaged due to over-current caused by the abrupt occurrence of a load when a clutch of an air compressor is connected thereon.

To prevent the subsidiary inverter 12 from being damaged due to the over-current, the over-current damage prevention apparatus of the present invention may include a pressure sensor 10 for sensing a pressure of an air tank, an air pressure switch 11 operating when the pressure of the air tank is lowered to less than a predetermined pressure, and an inverter 12, which includes a controller, for controlling the speed of a power steering motor 15. The pressure sensor 10 and the air pressure switch 11 may be connected to the inverter 12, and a relay 13 may be connected to the inverter 12, a battery and a clutch of the air compressor. When the air pressure switch 11 operates, the relay 13 may engage the clutch of the air compressor.

The inverter 12 may convert DC voltage of the battery into AC voltage of the battery and may reduce the speed of the power steering motor 15 by lowering the voltage applied to the power steering motor 15 before the clutch of the air compressor is connected thereon, when a particular condition is satisfactory.

The over-current damage prevention method for the subsidiary inverter 12 of the electric bus according to an exemplary embodiment of the present invention will be described as follows.

When an electric bus starts up, a satisfactory operating condition of the air compressor may be determined through the pressure sensor 10 and the air pressure switch 11. In particular, when the pressure sensor 10 senses a pressure of the air tank, and determines the pressure of the air tank to be substantially less than 8 Bar or the air pressure switch 11 is on, the inverter 12, which includes a controller, may receive a sensing signal input from the pressure sensor 10 and the air pressure switch 11 to reduce the speed of the power steering motor 15 by lowering the voltage applied to the power steering motor 15 before the air compressor is operated. Furthermore, the air compressor may be operated when the clutch of the air compressor may be engaged by turning on the relay 13.

When the pressure of the air tank is not substantially less than 8 Bar or when the air pressure switch 11 is off, the clutch may be disengaged by the relay 13 to stop the operation of the air compressor.

Figure 6:
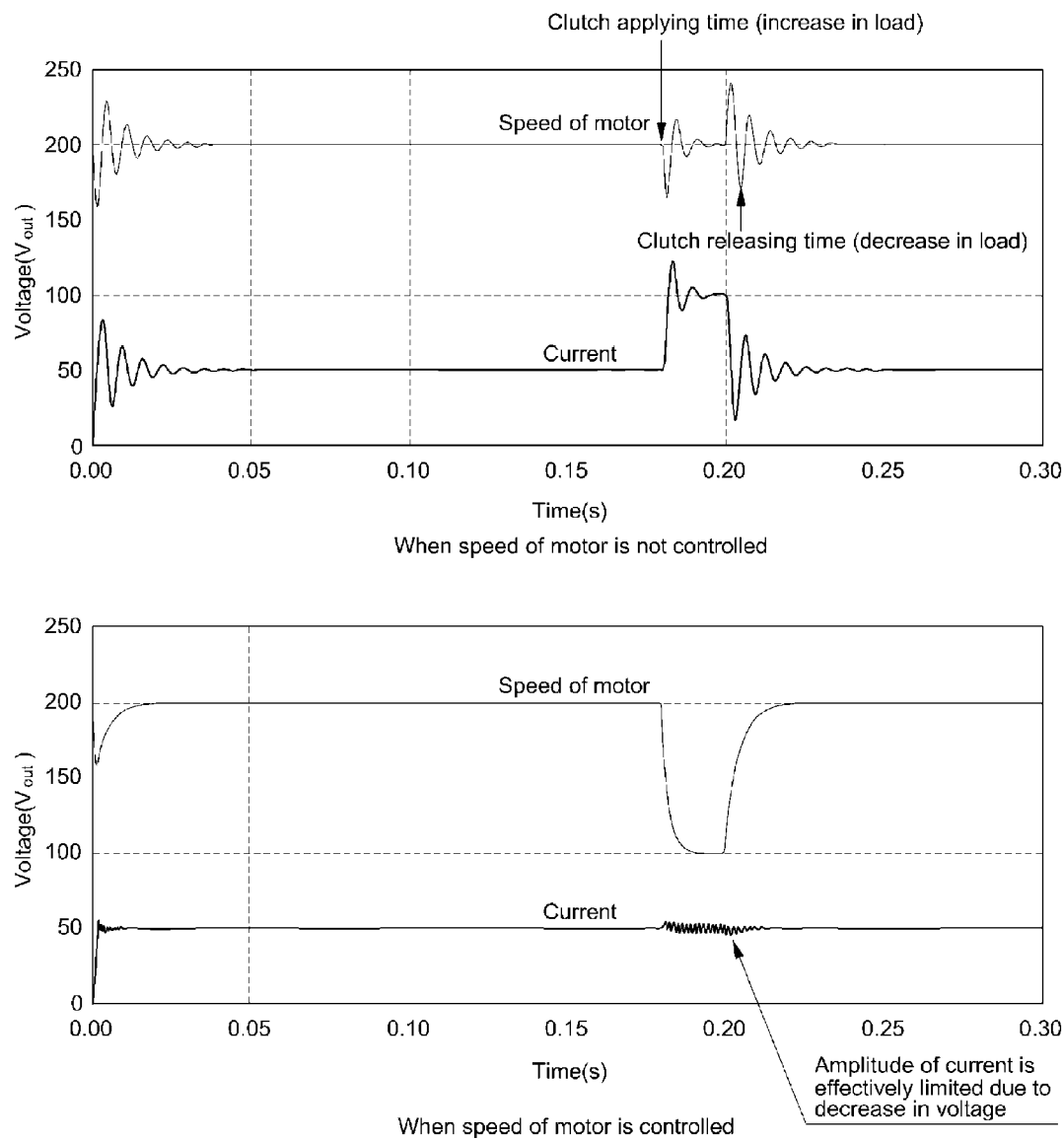
FIG. 6 illustrates exemplary results obtained from an experiment on the presence of surge current generation when the speed of a power steering motor is not controlled under the operation condition of an air compressor before a clutch is connected thereon, according to an exemplary comparison with when the speed of the power steering motor is reduced before the clutch is connected thereon by controlling the speed of the power steering motor, according to an exemplary embodiment of the present invention.

FIG. 6 illustrates exemplary results obtained from an experiment on the presence of surge current generation when the speed of the power steering motor 15 is not controlled under the operation condition of the air compressor before the clutch is connected thereon according to an exemplary comparison with when the speed of the power steering motor 15 is reduced before the clutch is connected thereon by controlling the speed of the power steering motor 15 according to an exemplary embodiment of the present invention.

Referring to FIG. 6, when the speed of the power steering motor is not controlled before the clutch is connected thereon, surge current was generated from the time when the clutch was connected thereon. When the speed of the power steering motor is reduced by controlling the speed of the power steering motor before the clutch was connected thereon, surge current was not generated.

Thus, according to the present invention, when the pressure of the air tank is substantially less than a setup value or the air pressure switch 11 is on, the speed of the power steering motor 15 may be reduced before the air compressor is operated, to prevent the subsidiary inverter 12 from being damaged due to the generation of surge current, thereby increasing reliability of components.

According to the above mentioned disclosure, the present invention may alleviate burdensome costs to the subsidiary inverter 12 replacement due to damage. In addition, it may be possible to prevent, in advance, an accident caused from loosing control of the steering and braking due to the non-operation of the power steering motor and the air compressor when the subsidiary inverter 12 is damaged during driving.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An over-current damage prevention method for a subsidiary inverter of an electric bus, comprising:
   sensing, by a sensor, a pressure of an air tank and an on position of an air pressure switch;
   reducing, by a controller provided in an inverter, a speed of a power steering motor by controlling the voltage applied to the power steering motor when the pressure of the air tank is less than a setup value or when the air pressure switch is on; and
   in response to reducing the speed of the power steering motor, maintaining, by the inverter, a clutch in an engaged position to transmit power for the power steering motor to an air compressor.

2. An over-current damage prevention apparatus for a subsidiary inverter of an electric bus, comprising:
   a pressure sensor and an air pressure switch, both configured to detect a pressure in an air tank; and
   an inverter configured to receive a signal from the pressure sensor and the air pressure switch to control the speed of a power steering motor by controlling the voltage applied to the power steering motor when the pressure of the air tank is less than a setup value or the air pressure switch is on.

3. A non-transitory computer readable medium, containing program instructions executed by a processor within an inverter, the computer readable medium comprising:
   program instructions that detect a pressure of an air tank through a pressure sensor and an on position of an air pressure switch;
   program instructions that reduce a speed of a power steering motor by controlling the speed of the power steering motor when the pressure of the air tank is less than a setup value or when the air pressure switch is on; and
   program instructions that transmit power from the power steering motor to an air compressor after the speed of the power steering motor is reduced by maintaining a clutch in an engaged position.

* * * * *